United States Patent Office

3,114,770
Patented Dec. 17, 1963

3,114,770
RECOVERY OF TARTARIC ACID, AS THE CALCIUM SALT, FROM WINE DREGS
Ismael Dabul, Mendoza, Argentina, assignor to Orandi & Massera, Sociedad Anonima Industrial & Comercial, Lanus, Buenos Aires, Argentina
No Drawing. Filed Jan. 20, 1959, Ser. No. 787,828
3 Claims. (Cl. 260—536)

The present invention relates to a method of producing calcium tartrate, and more particularly, the present invention is concerned with producing calcium tartrate crystals of relatively high purity from the residual materials accruing in the fermentation of vegetabilic materials, particularly from the dregs of wineries.

Calcium tartrate is conventionally obtained from the dregs of vinification by first drying and comminuting the dregs, and thereafter digesting the same with water and steam in order to dissolve soluble tartaric acid. The mixture is then allowed to settle for several hours and the thus obtained clear supernatant liquid is passed to precipitation tanks and therein treated with calcium hydroxide, and calcium sulfate or chloride. Thereby calcium tartrate is formed with precipitates and can be separated from the liquid by decantation or filtration. The thus obtained calcium tartrate may then be dried, or while still containing an appreciable percentage of moisture, may be passed to decomposing tanks for treatment with sulfuric acid in order to obtain tartaric acid.

It is also possible to obtain by digestion of dregs and the like a semi-liquid mass containing partially solubilized potassium bitartrate, and, in suspension, the calcium tartrate originally contained in the dregs. This mass may then be treated with lime milk and a calcium salt under continuous agitation, whereby the tartrates will be converted into calcium tartrate. The calcium tartrate is then separated, after agitation several hours, from the other components of the mass such as sand and separable impurities of all kinds.

Substantially the only raw material source for the production of calcium tartrate is found in the residue or dregs accruing from grape fermentation processes, primarily in wineries. These residues contain tartaric acid in the form of potassium bitartrate and, to a relatively small extent, as calcium tartrate. In order to separate the tartrates from the remainder of the residue, the same have to be transformed into calcium tartrate. Commercial calcium tartrate contains about 50% tartaric acid and forms a water-insoluble powder consisting of small crystals of yellow, grey or light brown color, depending on the type and quantity of impurities contained therein. It is of great economic and technical importance to produce calcium tartrate of the highest possible purity. For instance, high purity of the calcium tartrate will greatly facilitate the production of tartaric acid therefrom. The tartaric acid content of 100% pure calcium tartrate is equal to 57.7% of the same. Calcium tartrate is chosen for separating tartaric acid compounds, because the solubility of calcium tartrate in water is very low, ranging from about 0.04% at 0° C. to about 0.2% at 85° C. In contrast thereto, tartaric acid and neutral alkali metal salts are highly soluble in water and the solubility of potassium bitartrate in water ranges from about 0.4% at 0° C. to about 6% at 100° C.

Chemically, two molecules of potassium bitartrate will react with one molecule of calcium hydroxide under formation of one molecule of calcium tartrate, one molecule of neutral potassium tartrate and two molecules of water. If the calcium hydroxide is replaced by calcium carbonate one molecule of water and one molecule of carbon dioxide will be formed.

The thus obtained mixture of tartrates is then treated further in order to transform the neutral potassium tartrate into calcium tartrate. This is accomplished by reacting the neutral potassium tartrate with calcium chloride or calcium sulfate, whereby calcium tartrate and either potassium chloride or potassium sulfate are formed.

While the above discussed reactions and the various possible steps of carrying out the process appear simple, in fact, great difficulties are encountered. The main difficulty appears to be that calcium tartrate produced as discussed above, does not possess the desired degree of purity. Many attempts have been made to obtain by the above discussed reactions calcium tartrate of commercial and even higher purity, i.e. a purity higher than 47–48% tartaric acid content, and to obtain the high purity calcium tartrate in as simple and economical manner as possible.

All of these methods substantially follow the steps of digesting the dregs in hot water, with or without adding mineral acids or strong alkalis, substantially complete clarification of the digestion liquid, for instance by decantation, and subsequent precipitation of calcium tartrate from the clear liquids. According to all of these methods, it is essential that the liquid from which the calcium tartrate is to be precipitated must be clear and free of suspended matter.

The reason why it is so difficult to clarify the digestion liquid is that the wine dregs contain in addition to potassium bitartrate and some calcium tartrate, relatively large quantities of partially fermented vegetabilic matter, gums, mucilage, pectines, small cellulosic particles, and varying quantities of grape seeds, sand, etc.

The seeds, sand and large vegetabilic particles are easy to separate from the liquid, since they are of considerable size and settle quickly. On the other hand, the fermented matter, gums, pectines, etc., settle only very slowly, and it is practically impossible to remove the same by filtration.

When precipitation of the calcium tartrate is carried out in turbid liquids containing such gums, mucilage and other matter which cannot be filtered off, or can be filtered off only under very great difficulties, very dark and impure sludge of calcium tartrate will slowly deposit on the bottom of the treating vessel. The calcium tartrate will be so impure because it carries along during its sedimentation a relatively great quantity of such insoluble but also substantially unfilterable matter, and also due to the increase in the pH resulting from the addition of lime milk or the like. It must be kept in mind that the semi-colloidal impurities which at a lower pH are kept in suspension will precipitate so as to cling to the small calcium tartrate crystals, when the pH rises. It is very difficult to wash the thus obtained calcium tartrate. Thus, the production of calcium tartrate of at least commercial quality is an involved, rather uneconomical process during which considerable losses of tartaric acid radicals cannot be avoided.

In view of the importance of producing commercial calcium tartrate in a more economical manner, many variations of the basic method have been attempted. For instance, it has been suggested to digest the dregs and to subject the thus obtained liquid to a pressure treatment in autoclaves, at a pressure of between 4 and 6 atmospheres for a period of between 3–6 hours. In this manner, the gums, mucilage, etc. are rendered insoluble, and thus filtration is made possible and clear liquids can be obtained. However, the process is costly, particularly considering the large quantities of digestion liquids which have to be thus treated. According to other suggestions, the dregs are first toasted and subsequently digested. This, too, requires costly apparatus, the starting material must be dry, and, furthermore, a portion of the tartaric matter is destroyed.

According to all these previous methods, the calcium tartrate is precipitated in the form of small rhombic crystals the dimensions of which are between 50 and 80μ, and which have a very slow velocity of sedimentation.

It is therefore an object of the present invention to overcome the above described difficulties and disadvantages of conventional methods for the production of calcium tartrate.

It is another object of the present invention to provide a method for the production of calcium tartrate of at least commercial purity in a simple and economical manner.

It is a further object of the present invention to carry out the production of calcium tartrate of at least commercial purity in such a manner that removal of substantially all of the difficultly filterable matter from the liquid in which calcium tartrate is formed, will not be required.

Other objects and advantages of the present invention will become apparent from a further reading of the description and of the appended claims.

With the above and other objects in view, the present invention broadly includes a method of producing calcium tartrate from the residue accruing in the production of fermented alcoholic products from grapes, the residue containing water-soluble tartrates, comprising the steps of treating the residue with a hot aqueous liquid (i.e. a liquid which primarily consists of and the effective component of which is water, which however need not consist of pure water, f.i. may be the residual liquid of the process of the present invention) so as to form an acidic aqueous solution of the soluble tartrates, including easily filterable, solid particles and also including difficultly filterable substances, separating the easily filterable solid particles from the remainder of the solution, diluting the remainder of the solution so as to considerably reduce the concentration of the soluble tartrates therein, introducing crystals of calcium tartrate of predetermined size into the diluted solution, treating the diluted solution with calcium compounds so as to at least neutralize the solution and to react substantially all of the soluble tartrates with the calcium compounds under formation of calcium tartrate, the calcium tartrate precipitating in the form of crystals of at least the predetermined size, and separating the crystals of calcium tartrate, whereby calcium tartrate of at least commercial purity is formed.

Thus, according to the present method, the filterable insoluble particles are separated from the aqueous tartaric solution obtained by the extraction or digestion of the residue of vegetabilic fermentation processes such as wine making, while the difficultly filterable more or less semi-colloidal matters such as gums, pectines, mucilage and the like remain in the aqueous solution. The solution is diluted in order to reduce the concentration of soluble tartrates therein, seed crystals of calcium tartrate are introduced and the solution is treated with a neutralizing agent and a calcium compound. Preferably, calcium carbonate is used as the neutralizing agent and an additional calcium compound such as calcium sulfate or calcium chloride is introduced in order to complete the conversion of the soluble tartrates into calcium tartrate in accordance with the reactions described further above. In this manner, and particularly due to the high dilution of the soluble tartrates, the precipitation of calcium tartrate takes place in a slow and gradual manner. The speed of the reaction will be such that due to their slow formation, the calcium tartrate crystals can grow to relatively large size. This is facilitated by the introduction of the calcium tartrate seed crystals.

Calcium carbonate is employed to advantage as the neutralizing agent. The calcium carbonate is preferably introduced in the form of an aqueous suspension.

The speed of reaction, neutralization and precipitation, according to the present invention, is also reduced due to the great dilution of the solution obtained from the fermentation residue or dregs, which dilution can be carried out either by the addition of water or by the addition of further processed solutions.

It is a particular advantage of using calcium carbonate as the neutralizing agent for neutralizing the acidic solution obtained by digesting the dregs or the like, that calcium carbonate is practically insoluble in water and therefore will not cause alkalinization of the solution even if the calcium carbonate is introduced in excess of the quantity which can react with the soluble tartrates or which is required to neutralize the solution. Thus, it is not possible by the introduction of calcium carbonate to arrive at a pH value as high as pH 7. Since the tartaric syrup or solution thus will always show at least a slight acidic reaction, precipitation of certain impurities such as colloids which would precipitate in an alkaline medium, will not occur. These impurities if precipitated would cling to the calcium tartrate crystals, by preventing their precipitation. Under colloids, semi-colloids and the like will be understood in the context of the present application such substances as gums, pectines, mucilage, etc. which have been described above as difficultly filterable or non-filterable.

The process of the present invention can be carried out in conventional equipment by digesting the dregs with hot water, separating the filterable impurities and continuing to treat the remainder of the digestion liquid. The filterable impurities may be washed with hot water and the wash water later added to the digestion liquid for further treatment, together with the same. Mineral acids are introduced so as to transform natural or original calcium tartrate to soluble compounds.

The thus partially clarified tartaric liquids are further diluted by introducing into the same either additional water or the liquid remaining after the removal of calcium tartrate therefrom in the last step of the process.

The reaction vessel in which the precipitation of calcium tartrate is then carried out by introduction of preferably a suspension of calcium carbonate and plaster of Paris is provided with suitable agitators. The entire process of the present invention is preferably carried out in a continuous manner by suitably connecting the individual parts of the apparatus so as to achieve a flow of the liquid from the digester to the wet classification unit in which the calcium tartrate crystals are separated. After separating the calcium tartrate, a portion of the same may be reintroduced into the process as seed crystals, while the major portion will be washed and dried in a manner well known per se. The really great dilution of the tartaric ions occurs when the digestion liquids are instantaneously mixed with the reaction vessels contents, by the stirring device.

Thus, by properly controlling in conventional manner the flow of liquid to the digestor and from the same through the reaction vessel to the wet classifier, as well as the recycling of liquid from the wet classifier, and by also controlling the input of dregs in the digestor, the present process can be easily carried out in a continuous manner and without requiring any special apparatus other than the conventional types of equipment well known in the art.

The following example is given as illustrative only, the invention, however, not being limited to the specific details of the example.

*Example I*

As described above, 250,000 liters of digestion liquid obtained by digesting the dregs of a winery and containing at an average 20.7 g. of potassium bitartrate per liter as well as 3 g. of natural calcium tartrate, were treated in a continuous manner at a rate of 5000 liters per hour.

Before entering the reaction vessel, but after removal of the filterable particles, the liquid was diluted to an hourly volume of 12,000 liters.

Upon seeding and reacting the liquid as described further above, a magma of large calcium tartrate crystals was obtained, amounting after centrifugation and drying to 6690 kg. for the entire 250,000 liters of treated digestion liquid. Analysis of the thus obtained calcium tartrate revealed a purity of 91%.

While the process has been primarily described as using calcium carbonates and sulfates as the chemical compounds which are added for the precipitation of the calcium tartrate, it must be noted that it is also possible to carry out the present process with calcium hydroxide in place of calcium carbonate and calcium salts such as calcium nitrate or chloride instead of calcium sulfate. However, the use of calcium carbonate and calcium sulfate is preferred.

As stated further above, calcium tartrate seed crystals are introduced and retained in suspension during the crystallization process by constant stirring.

Preferably, the calcium tartrate seed crystals will show the following size classification:

| | Percent |
|---|---|
| Largest mesh 40 (Tyler mesh) | 20–30 |
| Retained between mesh 40 and 60 | 30–40 |
| Retained between mesh 60 and 100 | 25–35 |
| Retained between mesh 100 and 200 | 5–10 |
| Smallest mesh 200 | 0.5–5 |

The calcium tartrate crystals formed during the present process are substantially of the same or of larger sizes than the seed crystals.

Substantially following the description given in Example I above, the present process may be carried out as follows:

*Example II*

250,000 liters of digestion liquid are obtained according to Example I and containing after dilution 8.7 g. of potassium bitartrate per liter. The temperature of the liquid is between 65 and 68° C. Solid particles such as sand, etc. are continuously separated while the liquid passes through a double cone separator to the reactor. Upon entering the reactor, about between 180–250 kg. of calcium tartrate seed crystals per hour are continuously added in the form of an aqueous suspension, thereby simultaneously reducing the concentration of potassium bitartrate, and when these liquids arrive to the reaction tank (with agitation) are instantaneously mixed with the reaction tank contents, resulting a mixture of about 2–4 grs. per liter of potassium bitartrate. An aqueous suspension of calcium carbonate and calcium sulfate in equimolecular proportions is continuously introduced into the reaction tank which in this case has a capacity of about 7000 liters, so that the liquid at an average remained in the reaction tank roughly for 35 minutes. The liquid containing suspended crystallized calcium tartrate passed then to a further tank of 10,000 liters capacity wherein the reaction terminated at a pH of about 5. The suspension then passed through another double cone classifier on the bottom of which the calcium tartrate collected while the major portion of the liquid and impurities were separated therefrom. The calcium tartrate from the bottom of the classifier or separator passed partly to the inlet of the reaction tank for seeding purposes, while the major portion was introduced into a washer and then discontinuously removed from the same with a water content of between 50 and 80%. After centrifugation and drying, 6690 kg. of calcium tartrate containing 52.5% of tartaric acid (purity 91%) were obtained.

*Example III*

70 tons of moist wine dregs of the composition given below were treated as described above.

Analysis of moist dregs:

| | Percent |
|---|---|
| Moisture | 54 |
| Potassium bitartrate | 14.2 |
| Calcium tartrate | 0.8 |
| Silica (combined silica) | 1 |
| Sand | 0.7 |
| Nitrogenous substances | 10.6 |
| Phosphoric acid ($P_2O_5$) | 2.2 |
| Iron ($Fe_2O_3$) | 0.1 |
| Alumina ($Al_2O_3$) | 0.1 |

Remainder, undetermined organic matter, cellulose, magnesia, etc.

The dregs appeared as a pasty mass of reddish violet color, alcoholic smell, with 0.3% grape seeds included besides other cellulosic materials of similar size. The dregs were suspended in cold water under stirring at the rate of 3000 liters of water per ton of dregs, and thereafter, the alcohol was distilled off at the rate of 1 ton of dregs, equal to 3500 liters of the dregs-water mixture, per hour. Due to steam condensing in the direct steam distilling apparatus, 4000 liters per hour of alcohol-free dregs-water mixture were released from the distilling apparatus. The mixture contained 35–36 g. of bitartrate per liter and left the distilling apparatus at a temperature of between 96 and 98° C. Water was continuously added so as to form a mixture of about 6000 liters per hour having a temperature of about 70° C. and containing between about 23 and 24 g. of bitartrate per liter. The thus formed mixture was then further processed as described in the previous example. About 13,000 kg. of dry tartrate containing 52.5% of tartaric acid were thus obtained in a total working time of 75 hours. The time during which acidic liquid actually entered the reaction tank amounted to 70 hours. Simultaneously, 2800 kg. of easily separable sludge, seeds, sand, etc. were obtained, washed with hot water which then was re-introduced for diluting purposes.

Preferably, the concentration of potassium bitartrate in the solution prior to introduction of the calcium compounds, is maintained between 2 and 5 g. per liter. The mixture in the reaction tank is agitated either by stirring or by withdrawing liquid from the bottom and reintroducing the same from the top of the reaction tank in order to keep the seed crystals in suspension.

Calcium carbonate and calcium sulfate are preferably introduced in the form of a suspension and having particle sizes so as to pass through a mesh 200.

Calcium tartrate crystals of the sizes obtained according to the present invention, i.e. the size of the seed crystals or larger, possess a much greater velocity of sedimentation, than the smaller calcium tartrate crystals obtained according to the first described methods. Thus, the larger crystals can be separated much easier from the impurities contained in the liquid, which impurities are then carried away together with the liquid. Any excess amount of calcium carbonate will also be carried away—at least the major portions thereof—with the liquid.

Without further analysis, the foregoing will so surely reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing calcium tartrate from the residue accruing in the production of fermented alcoholic products from grapes, said residue containing water soluble tartrates, comprising in the indicated sequence the steps of contacting said residue with hot water so as to form an acidic aqueous solution of said soluble tartrates, including easily filtrable solid particles and also including difficultly filtrable substances forming a substantially stable suspension in said solution; separating said easily filtrable solid particles from the remainder of said solution; diluting said remainder of said solution so as to considerably reduce the concentration of said soluble tartrates therein; introducing crystals of calcium tartrate of predetermined size into said diluted solution; contacting said diluted solution with a calcium compound selected from the group consisting of calcium carbonate and calcium hydroxide and a calcium salt selected from the group consisting of calcium sulfate, calcium nitrate and calcium chloride so as to react substantially all of said soluble tartrates with said calcium compounds under formation of calcium tartrate precipitating in the form of crystals of at least said predetermined size; and separating said crystals of calcium by tartrate sedimentation from said difficultly filtrable suspension, whereby calcium tartrate of at least commercial purity is formed.

2. A method of producing calcium tartrate from the residue accruing in the production of fermented alcoholic products from grapes, said residue containing water soluble tartrates, comprising in the indicated sequence the steps of contacting said residue with hot water so as to form an acidic aqueous solution of said soluble tartrates, including easily filtrable solid particles and also including difficultly filtrable substances forming a substantially stable suspension in said solution; separating said easily filtrable solid particles from the remainder of said solution; diluting said remainder of said solution so as to considerably reduce the concentration of said soluble tartrates therein; introducing crystals of calcium tartrate of predetermined size into said diluted solution; contacting said diluted solution with calcium carbonate and calcium sulfate in substantially equimolecular proportions so as to react substantially all of said soluble tartrates with said calcium compounds under formation of calcium tartrate precipitating in the form of crystals of at least said predetermined size; and separating said crystals of calcium tartrate by sedimentation from said difficultly filtrable suspension, whereby calcium tartrate of at least commercial purity is produced.

3. A method of producing calcium tartrate from the residue accruing in the production of fermented alcoholic products from grapes, said residue containing water soluble tartrates, comprising in the indicated sequence the steps of contacting said residue with hot water so as to form an acidic aqueous solution of said soluble tartrates in a concentration of at least 10 grams per liter, including easily filtrable solid particles and also including difficultly filtrable substances forming a substantially stable suspension in said solution; separating said easily filtrable solid particles from the remainder of said solution; diluting said remainder of said solution so as to reduce the concentration of said soluble tartrates to below five grams per liter; introducing crystals of calcium tartrate of predetermined size into said diluted solution; contacting said diluted solution with a calcium compound selected from the group consisting of calcium carbonate and calcium hydroxide and a calcium salt selected from the group consisting of calcium sulfate, calcium nitrate and calcium chloride so as to react substantially all of said soluble tartrates with said calcium compounds under formation of calcium tartrate precipitating in the form of crystals of calcium tartrate, whereby calcium tartrate of at least commercial purity is formed.

References Cited in the file of this patent

UNITED STATES PATENTS

| | | |
|---|---|---|
| 2,303,602 | Braun | Dec. 1, 1942 |
| 2,419,020 | Hales | Apr. 15, 1947 |

OTHER REFERENCES

Cruess: "Principles and Practice of Wine Making," Second edition, 1947, pages 370–383.

Perry: "Chemical Engineers' Handbook," Third edition, 1950, pages 1054–1061.